(12) United States Patent
Furukawa

(10) Patent No.: US 8,947,388 B2
(45) Date of Patent: Feb. 3, 2015

(54) INPUT APPARATUS

(75) Inventor: Takashi Furukawa, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 145 days.

(21) Appl. No.: 13/812,447

(22) PCT Filed: Jul. 28, 2011

(86) PCT No.: PCT/JP2011/004294
§ 371 (c)(1),
(2), (4) Date: Jan. 25, 2013

(87) PCT Pub. No.: WO2012/014488
PCT Pub. Date: Feb. 2, 2012

(65) Prior Publication Data
US 2013/0120306 A1 May 16, 2013

(30) Foreign Application Priority Data
Jul. 28, 2010 (JP) .................................. 2010-169828

(51) Int. Cl.
*G06F 3/041* (2006.01)
(52) U.S. Cl.
CPC .............. *G06F 3/041* (2013.01); *G06F 3/0414* (2013.01); *G06F 2203/04106* (2013.01); *G09G 2330/12* (2013.01)
USPC ........................... 345/173; 345/156; 455/403
(58) Field of Classification Search
CPC ........................................... G06F 2203/04106
USPC ................... 345/156, 173; 455/403
See application file for complete search history.

(56) References Cited

U.S. PATENT DOCUMENTS

2006/0227114 A1 10/2006 Geaghan et al.
2007/0129046 A1* 6/2007 Soh et al. ...................... 455/403
(Continued)

FOREIGN PATENT DOCUMENTS

JP 11212725 A 8/1999
JP 2003288158 A 10/2003
(Continued)

OTHER PUBLICATIONS

An Office Action issued by the Korean Patent Office on Feb. 28, 2014, which corresponds to Korean Patent Application No. 10-2013-7004928 and is related to U.S. Appl. No. 13/812,447; with English language concise explanation.
(Continued)

*Primary Examiner* — Abbas Abdulselam
*Assistant Examiner* — Shawna Stepp Jones
(74) *Attorney, Agent, or Firm* — Studebaker & Brackett PC

(57) ABSTRACT

While detecting a contact as well as a pressure load to a touch sensor, to deal with a problem of the pressure load detection, an input apparatus 1 includes a touch sensor 11, a load detection unit 12 for detecting the pressure load on the touch sensor 11, a problem detection unit 16 for detecting the problem with the load detection unit 12, and a control unit 15 for controlling switchover between a first input mode for performing a predetermined operation when the touch sensor 11 detects the contact and a second input mode for performing the predetermined operation when the load detection unit 12 detects a pressure load satisfying a predetermined standard load while the touch sensor 11 is detecting the contact. The control unit 15, when the problem detection unit 16 detects the problem with the load detection unit 12, prevents switching to the second mode.

5 Claims, 9 Drawing Sheets

(56) References Cited

U.S. PATENT DOCUMENTS

| | | |
|---|---|---|
| 2008/0024459 A1 | 1/2008 | Poupyrev et al. |
| 2010/0136946 A1 | 6/2010 | Cho et al. |
| 2011/0181538 A1 | 7/2011 | Aono |
| 2011/0181539 A1 | 7/2011 | Aono |

FOREIGN PATENT DOCUMENTS

| | | |
|---|---|---|
| JP | 2006323571 A | 11/2006 |
| JP | 2008-033739 A | 2/2008 |
| JP | 2008130055 A | 6/2008 |
| JP | 2010-152736 A | 7/2010 |
| JP | 2010152737 A | 7/2010 |
| JP | 2010257240 A | 11/2010 |
| JP | 2011048685 A | 3/2011 |
| KR | 2007-0116959 A | 12/2007 |
| KR | 2008-0073111 A | 8/2008 |
| WO | 2010073728 A1 | 7/2010 |

OTHER PUBLICATIONS

International Search Report for PCT/JP2011/004294 mailed Nov. 1, 2011.

The extended European search report issued by the European Patent Office on May 27, 2014, which corresponds to European Patent Application No. 11812086.4-1904 and is related to U.S. Appl. No. 13/812,447.

An Office Action issued by Korean Patent Office on Sep. 30, 2014, which corresponds to Korean Patent Application No. 10-2013-7004928 and is related to U.S. Appl. No. 13/812,447; with English language concise explanation.

* cited by examiner

FIG. 2
(a)
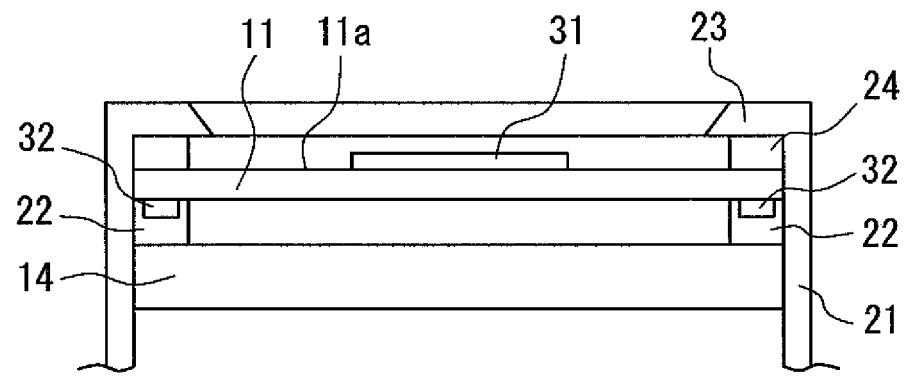
(b)
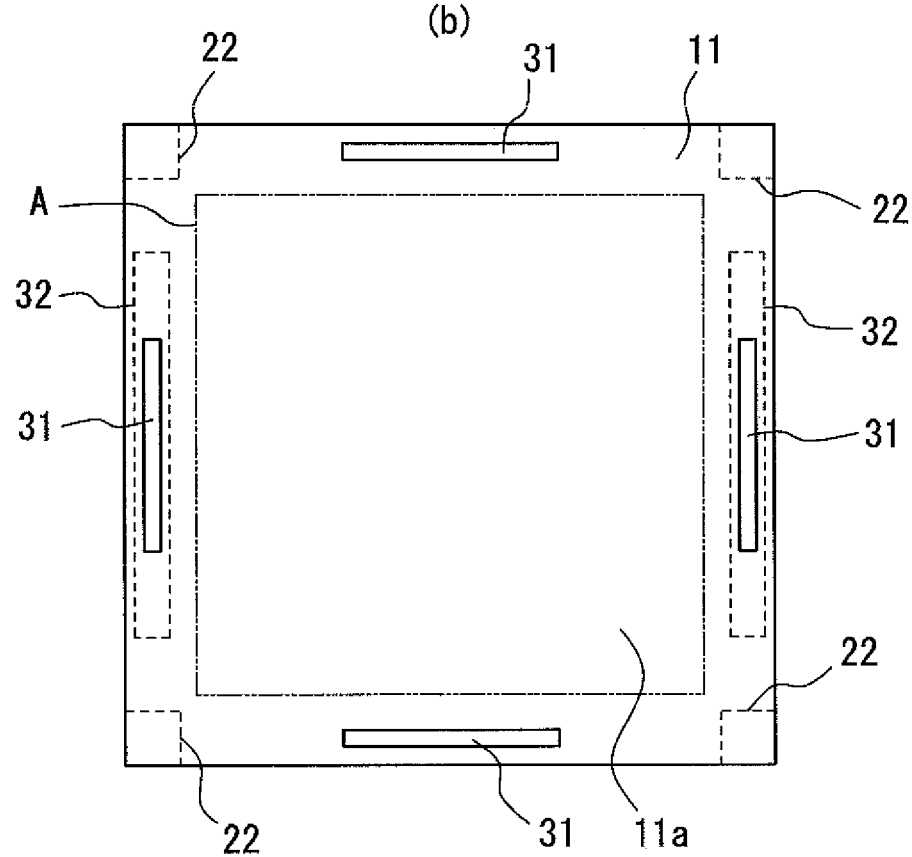

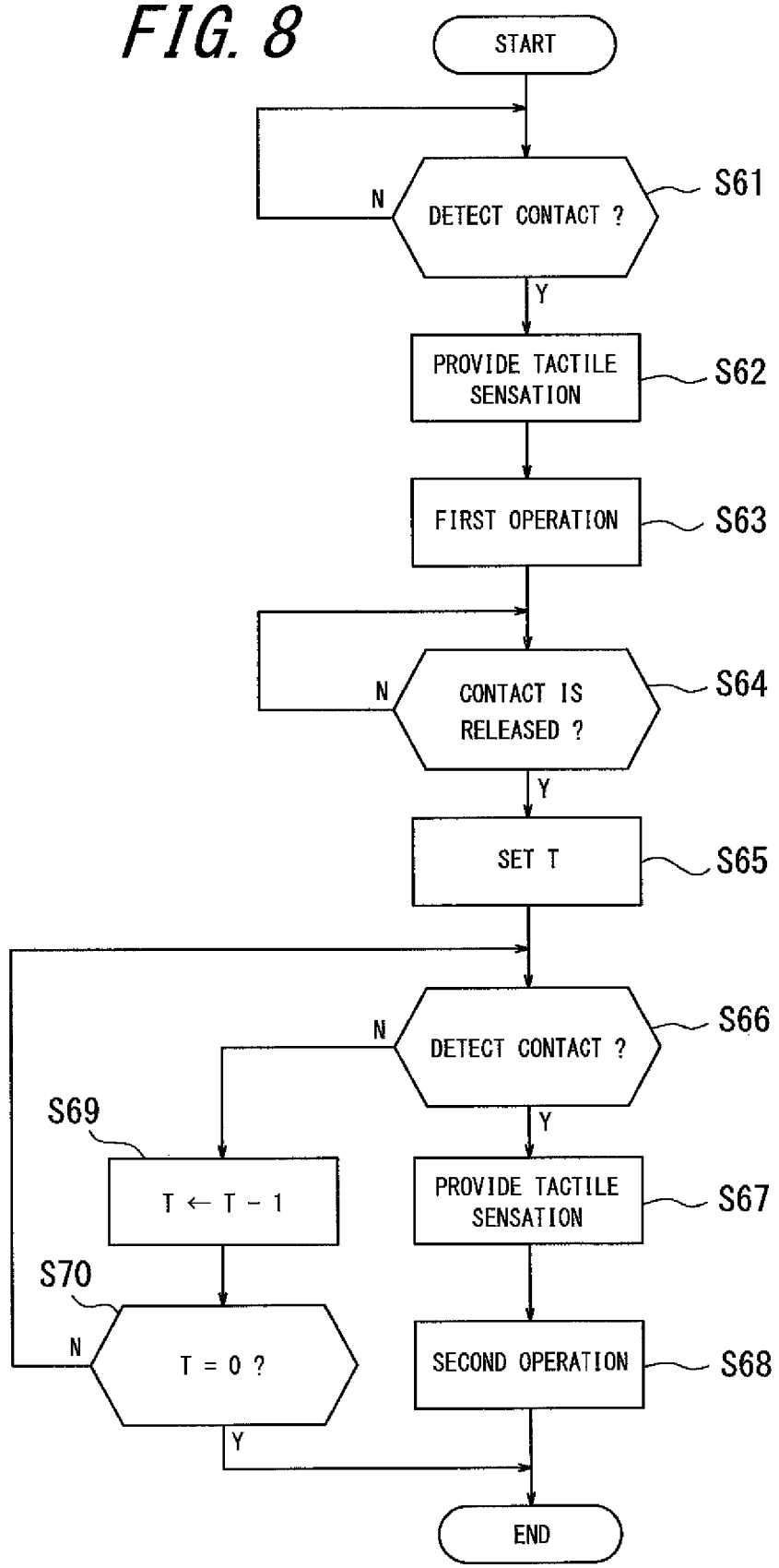

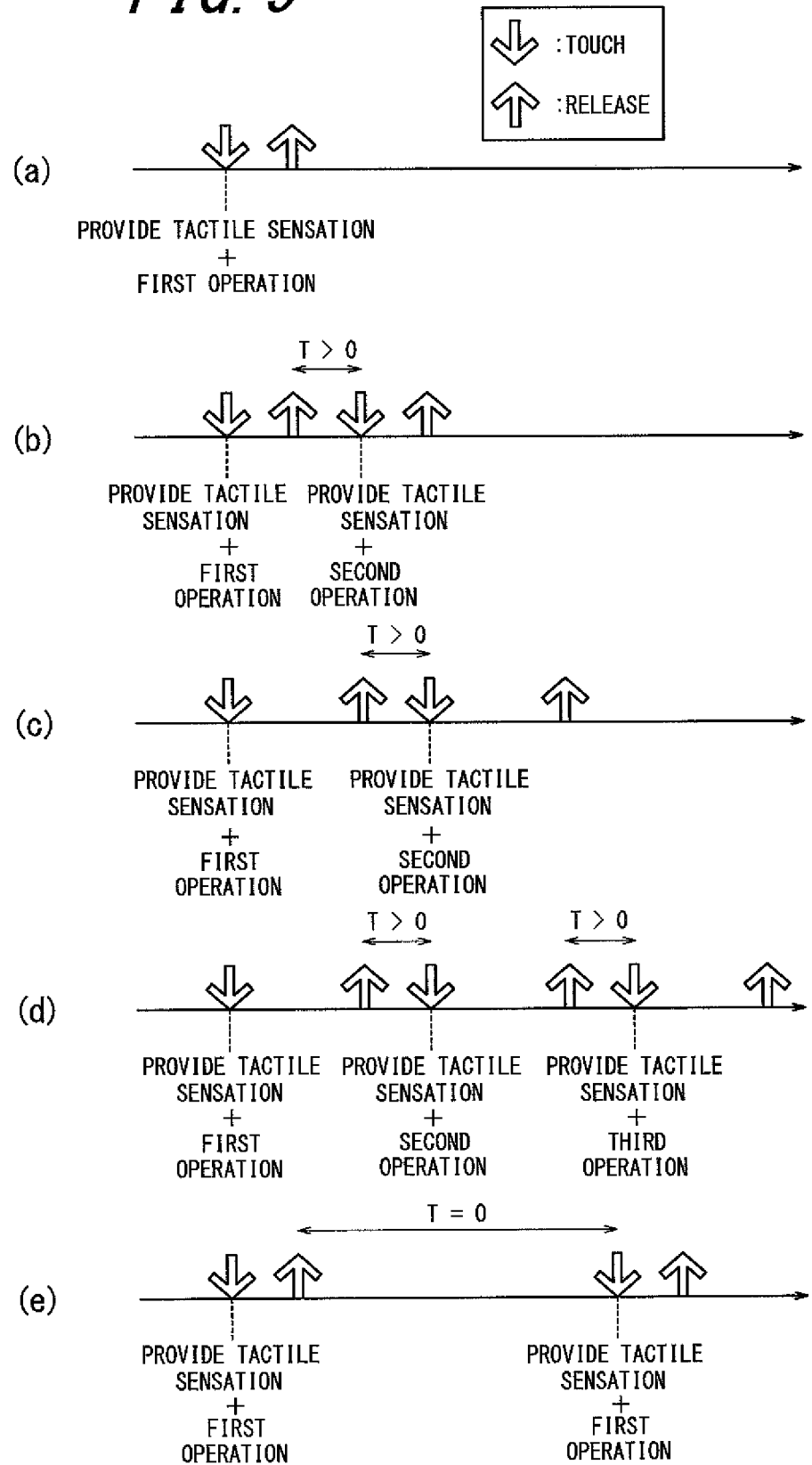

INPUT APPARATUS

CROSS REFERENCE TO RELATED APPLICATION

This application claims priority to and the benefit of Japanese Patent Application No. 2010-169828 filed on Jul. 28, 2010, the entire contents of which are incorporated herein by reference.

TECHNICAL FIELD

The present invention relates to an input apparatus for detecting a contact to a touch sensor.

BACKGROUND ART

In recent years, there are mobile terminals such as mobile phones that employ input apparatuses having touch sensors such as touch panels, touch switches, or the like, as input apparatuses such as operation units, switches and the like configured to detect operations by operators. Such input apparatuses having touch sensors are popularly employed not only by the mobile terminals but also by information equipments such as calculators, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of these types detect a contact by a finger or a stylus pen and, unlike mechanical push-button switches, the touch sensors themselves are not physically displaced when touched.

Therefore, the operator may not be able to obtain feedback in response to an operation to the touch sensor. Since the operator may not be able to obtain an operation sensation "having pressed or released pressing" upon the operation, the operator may not be able to confirm about whether the operation is appropriately detected by the terminal. In using such a terminal, accordingly, the operator is likely to perform a repetitious operation by repeatedly touching the same position, which may be stressful for the operator.

In order to prevent such an unnecessary repetitious operation, there is known a method to generate a sound when the contact to the touch sensor is detected. There is also known a method to change a display state, such as color or the like, of input objects such as input buttons and the like (hereinafter, referred to simply as an "object") displayed at a position on a display unit corresponding to a position where the contact is detected.

However, such auditory feedback may be difficult for the operator to confirm in a noisy environment and is not applicable when the equipment being used is in a silent mode. Further, through such visual feedback, if the object displayed on the display unit is small, the operator may not be able to confirm a change in the display state, as a view of the object is blocked by the finger, particularly when the operator is inputting by the finger.

In order to deal with such problems, there is suggested a feedback method relying on neither the auditory—nor visual sensation but instead vibrating the touch sensor when the touch sensor detects the contact (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

According to the techniques disclosed in the above Patent Documents 1 and 2, a light contact to the touch sensor by the finger or the like is received as an input and vibration is transmitted at operator's fingertip or the like. Therefore, in operating those input apparatuses, the operator can recognize, through vibration, that the operation to the touch sensor is received by the input apparatus.

Also, application of such techniques to the input apparatus enables generation of vibration based on position information from the touch sensor having detected the contact only when the contact is detected at a position corresponding to the object such as the button and the like displayed on the display unit. That is, the input apparatus adopting the techniques described above, while displaying the objects such as keys and the buttons on the display unit, may vibrate not when the contact is detected at a position having no keys on the touch sensor but when the contact is detected at a position on the touch sensor corresponding to the key.

The techniques disclosed in the above Patent Documents 1 and 2, however, merely vibrate the touch sensor in response to detection of the contact by the touch sensor. Therefore, especially when the button switch such as a mechanical push-button switch (push-type button switch) is graphically depicted on the touch sensor, the tactile sensation is provided when the finger or the like lightly touches the touch sensor. Accordingly, the input apparatus responds to a light contact (touch) before the operator applies a certain pressure on (pushes) the sensor, possibly causing an erroneous operation. Further, even when the operator has no intention to push the button switch graphically depicted (even when the operator does not apply a pressure), the tactile sensation is provided in response to the light contact (touch) before the operator pushes the touch sensor. Therefore, the operator may have a feeling of strangeness.

In operating the mechanical push-button switch, the operator should expect that a tactile sensation of depression of the switch (hereinafter, referred to as a click sensation) is provided when the operator presses the switch applying a certain pressure. Similarly, in operating the mechanical push-button switch, the operator expects that another tactile sensation of recovery of the pressed switch to an original unpressed state (hereinafter, referred to as a release sensation) is provided when the operator reduces the pressure being applied. In operating the mechanical push-button switch, further, the operator expects that neither the click sensation nor the release sensation is provided when touching or sliding a pressing position applying a very light pressure.

As such, the applicant has filed, with Japan Patent Office, an application on an input apparatus capable of providing a tactile sensation similar to that obtained when operating keys and the like configured by using the mechanical switches in operating a slide operation with the touch sensor (Japanese Patent Application No. 2009-197318).

This input apparatus has a load detection unit configured to detect a pressure load on a touch face of the touch sensor and provides the tactile sensation while a pressing operation applying a pressure load satisfying a predetermined standard load is detected. Accordingly, this input apparatus may prevent from receiving an input when the touch sensor detects a light contact unintended by the operator. Further, since this input apparatus provides the tactile sensation while providing a sense of pressure, this input apparatus may provide a realistic tactile sensation similar to that obtained when operating an actual push-button switch, which conventional apparatuses could not have achieved.

Also, such an input apparatus having the touch sensor may receive inputs of plurality of levels similar to, for example, a shutter button of a camera relative to the pressure load applied by the operator in operation. That is, some of the push-button switches, by detecting a "half-pressing" operation by the operator, may receive a first level input and turn on a function to adjust AF (Automatic Focus). Also, some of those switches, by detecting a "full-pressing" operation by the operator after receiving the first level input, may receive a second level input and release a shutter.

Having the load detection unit configured to detect the pressure load on the touch panel, the input apparatus described above may sequentially receive the inputs of a plurality of levels such as the first level input, the second level input, and a further level input and execute different operations assigned each of the levels. In operating such an input apparatus, the operator may execute a plurality of different operations independently as desired. The applicant has also filed an application on an invention of such an input apparatus with Japan Patent Office (Japanese Patent Application No. 2009-106749).

However, there is a disadvantage that, when a problem such as failure and the like of the load detection unit occurs and the load detection unit cannot detect the pressure load on the touch face of the touch sensor while the operator is operating the input apparatus having the load detection unit, this input apparatus may not receive an input. That is, this input apparatus does not receive an input based on an operation by the operator unless the pressure load on the touch face of the touch sensor satisfies the predetermined standard load. However, when the load detection unit of this input apparatus has the problem and may not detect the pressure load, the load detection unit may not detect the pressure load when the pressure load satisfies the predetermined standard load. In such a case, therefore, this input apparatus may not receive inputs based on operations by the operator thereafter.

As described above, although this input apparatus provides a comfortable operability when functioning normally, there is concern that the input apparatus, when the load detection unit has the problem, may not function regardless of a normal operation of the touch panel. Further, when this input apparatus is operating an input mode for receiving inputs of a plurality of levels as described above and the load detection unit may not detect the pressure load due to the problem, this input apparatus may not receive an input of any of the plurality of levels.

Accordingly, an object of the present invention in consideration of such a condition is to provide an input apparatus for detecting a contact to the touch sensor as well as the pressure load on the touch sensor capable of dealing with the problem of detection of the pressure load.

Solution to Problem

In order to achieve the above object, an input apparatus according to a first aspect of the present invention includes:

a touch sensor;

a load detection unit configured to detect a pressure load on the touch sensor;

a problem detection unit configured to detect a problem with the load detection unit; and a control unit configured to control switchover between a first input mode for executing a predetermined operation when the touch sensor detects a contact and a second input mode for performing the predetermined operation when the load detection unit detects a pressure load satisfying a predetermined standard load while the touch sensor is detecting the contact, wherein the control unit, when the problem detection unit detects the problem with the load detection unit, controls to prevent an operation to switch to the second input mode.

A second aspect of the present invention is the input apparatus according to the first aspect, wherein the control unit, when the problem detection unit detects the problem with the load detection unit upon receiving an input to switch to the second input mode, controls to prevent the operation to switch to the second input mode.

A third aspect of the present invention is the input apparatus according to the first aspect, wherein the control unit, when the problem detection unit detects the problem with the load detection unit at the start of an operation of the control unit, controls to prevent the operation to switch to the second input mode.

A fourth aspect of the present invention is the input apparatus according to the third aspect, wherein the control unit, when the problem detection unit detects the problem with the load detection unit at activation of the input apparatus, controls to start the operation in the first input mode.

A fifth aspect of the present invention is the input apparatus according to any one of the first to fourth aspects further includes:

a tactile sensation providing unit configured to vibrate a touch face of the touch sensor, wherein the control unit, when the load detection unit detects the pressure load satisfying the predetermined standard load while the touch sensor is detecting the contact, controls the tactile sensation providing unit to provide a tactile sensation to a pressing object pressing the touch face.

Effect of the Invention

According to the present invention, the input apparatus for detecting the contact to the touch sensor as well as the pressing load on the touch sensor may deal with the problem of detection of the pressing load.

BRIEF DESCRIPTION OF DRAWINGS

FIG. 2(a) and FIG. 2(b) are diagrams illustrating an exemplary implementation structure of the input apparatus according to the first embodiment;

FIG. 8 is a flowchart illustrating an operation of the touch panel input mode according to the second embodiment; and FIG. 9(a) to FIG. 9(e) are diagrams illustrating concrete examples of operations of an input apparatus according to the second embodiment for substituting contact operations for pressing operations of a plurality of levels.

DESCRIPTION OF EMBODIMENTS

Embodiments of the present invention will be described with reference to the accompanying drawings.

First Embodiment

Figure 1:
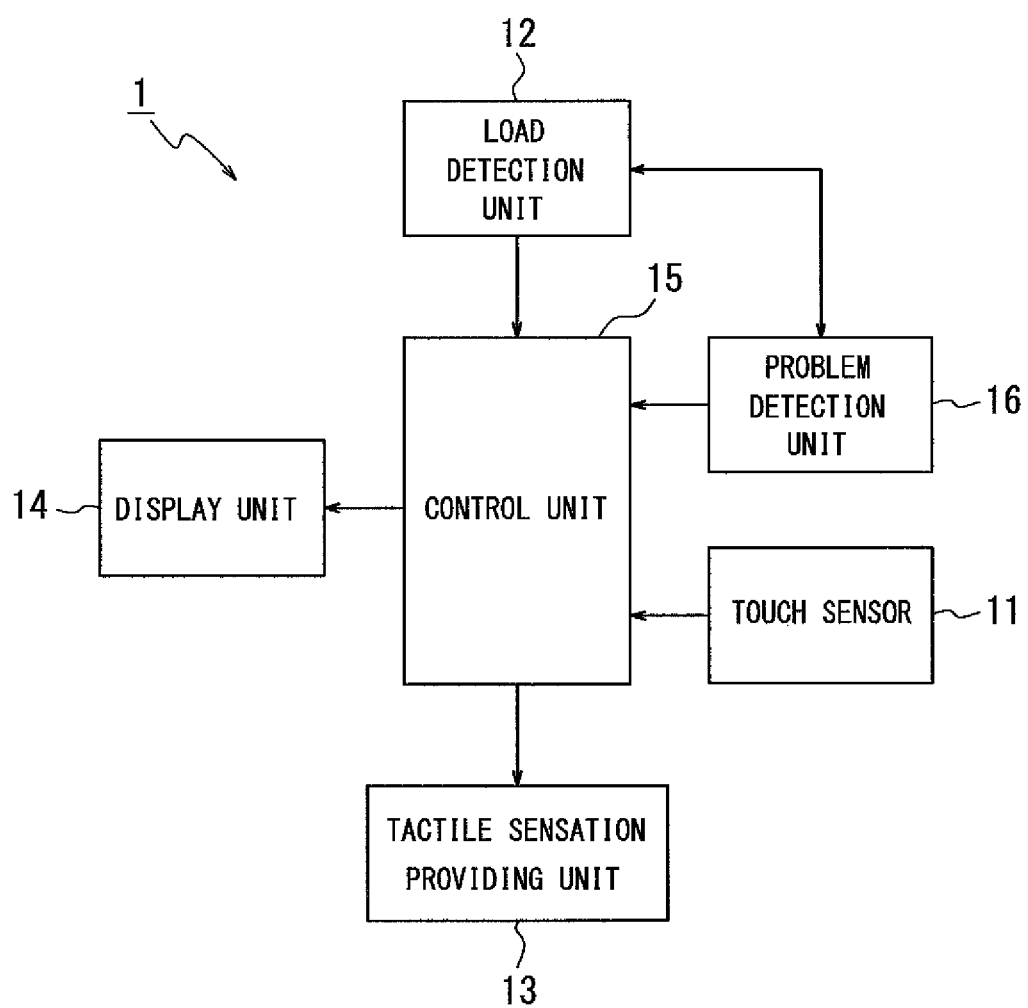
FIG. 1 is a block diagram illustrating a schematic configuration of an input apparatus according to a first embodiment of the present invention.

FIG. 1 is a functional block diagram illustrating a schematic configuration of an input apparatus according to a first embodiment of the present invention. According to the present embodiment, any input apparatus is applicable, as long as it receives an operator's operation by using a touch sensor. Such an input apparatus may be, for example, an input apparatus for inputting characters and numbers to mobile terminals or an input apparatus used for an ATM machine at a bank or for a ticket vending machine at a train station.

As illustrated in FIG. 1, an input apparatus 1 according to the present embodiment includes a touch sensor 11, a load detection unit 12, a tactile sensation providing unit 13, a display unit 14, a control unit 15 and a problem detection unit 16.

The touch sensor 11 is usually disposed on a front face of the display unit 14 such that a touch face of the touch sensor 11 detects a contact to an object such as a key and a button (hereinafter, referred to simply as a "key and the like") displayed on the display unit 14 by an operator's finger or the like. The touch sensor 11 may be of a resistive film type, a capacitive type, an optical type or the like, for example. The load detection unit 12 detects a pressure load on the touch face of the touch sensor 11 and is preferably configured by using an element which linearly reacts to a load such as, for example, a strain gauge sensor, a piezoelectric element or the like. The tactile sensation providing unit 13 vibrates the touch sensor 11 and may be configured by using, for example, a piezoelectric vibrator. The display unit 14 displays an object of an input button or the like such as a push-button switch (push-type button switch) and may be configured by using, for example, a liquid crystal display panel, an organic EL display panel or the like.

The control unit 15 controls and manages operations of the entire input apparatus 1. The problem detection unit 16, by monitoring the load detection unit 12, detects whether a problem has occurred to the load detection unit 12. In detail, the problem detection unit 16 detects whether the load detection unit 12 is unable to detect the pressure load on the touch sensor 11 due to a failure or the like. When the problem detection unit 16 detects the problem with the load detection unit 12 in the manner described above, the problem detection unit 16 notifies the control unit 15 of a detection result. When receiving the detection result notifying that the problem has occurred to the load detection unit 12, the control unit 15 sets a problem flag, thereby the control unit 15 knows, without detection of the problem by the problem detection unit 16, that the load detection unit 12 has the problem. An operation performed in this case will be described below.

FIG. 2 illustrates an exemplary implementation structure of the input apparatus 1 illustrated in FIG. 1; FIG. 2(a) is a cross-sectional view of a main section, and FIG. 2(b) is a plane view of the main section. The display unit 14 is contained and held in a housing 21. The touch sensor 11 is held on the display unit 14 via insulators 22 made of elastic members. In the input apparatus 1 according to the present embodiment, the display unit 14 and the touch sensor 11 are rectangular in shape in a planar view. According to the present embodiment, also, the touch sensor 11 is held on the display unit 14 via the insulators 22 arranged at four corners outside a display area A of the display unit 14 illustrated by chain double-dashed lines in FIG. 2(b).

The housing 21 is provided with an upper cover 23 covering a surface area of the touch sensor 11 outside the display area of the display unit 14. An insulator 24 made of elastic member is arranged between the upper cover 23 and the touch sensor 11.

The touch sensor 11 illustrated in FIG. 2 may have, for example, a surface member having a touch face 11a and made of a transparent film or the glass, and a rear face member made of the glass or acryl. The touch sensor 11 is designed such that, when the touch face 11a is pressed down, a pushed part is bent (strained) slightly relative to a pressing force or a structure itself bends slightly.

A strain gauge sensor 31 for detecting a load (pressuring force) applied on the touch sensor 11 is provided, adhered or the like, on a surface of the touch sensor 11 at a position close to each periphery covered by the upper cover 23. In addition, a piezoelectric vibrator 32 for vibrating the touch sensor 11 is provided, adhered or the like, on the rear face of the touch sensor 11 at a position close to a periphery on each of two opposing sides. That is, the input apparatus illustrated in FIG. 2 has the load detection unit 12 illustrated in FIG. 1 including four strain gauge sensors 31 and the tactile sensation providing unit 13 including two piezoelectric vibrators 32. The tactile sensation providing unit 13 vibrates the touch face 11a by vibrating the touch sensor 11. It is to be noted that the housing 21, the upper cover 23 and the insulator 24 illustrated in FIG. 2(a) are omitted in FIG. 2(b).

Next, two input modes according to the present embodiment will be described. According to the present embodiment, a conventional input mode, in which an input is received when the touch panel 11 detects the contact, is referred to as a "touch panel input mode". On the other hand, an input mode, in which the input is received when the touch panel 11 detects the contact and also the load detection unit 12 detects a pressure load satisfying a predetermined standard load, is referred to as a "haptic input mode".

Figure 3:
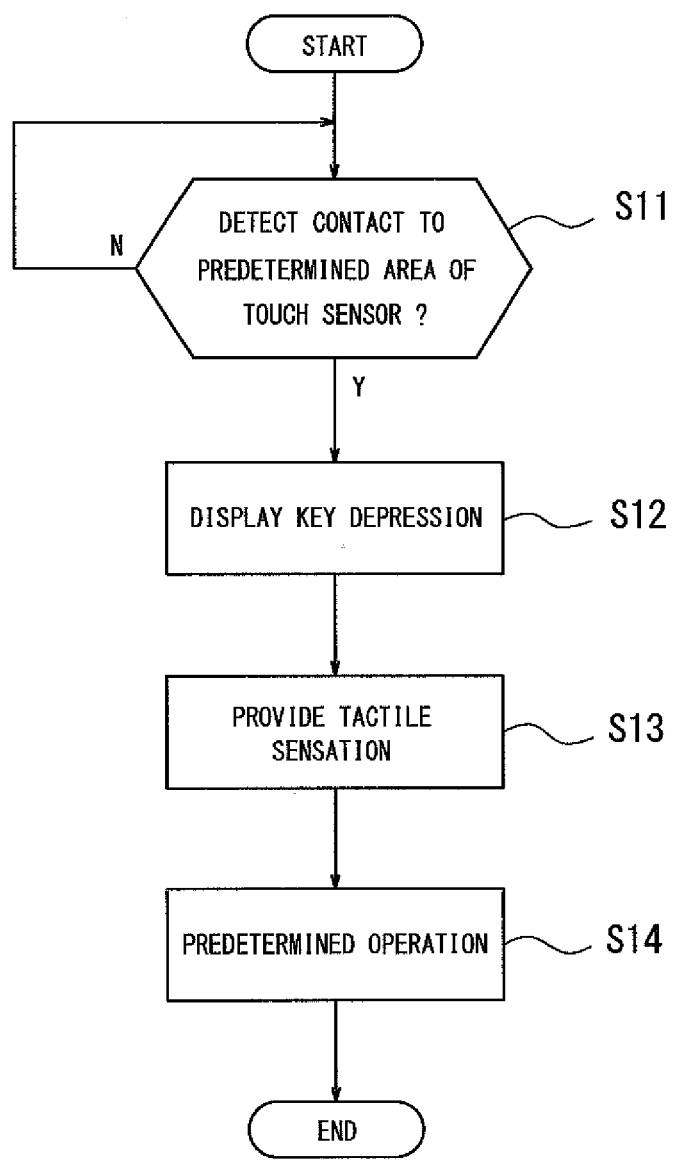
FIG. 3 is a flowchart illustrating an operation of a touch panel input mode according to the first embodiment.

FIG. 3 is a flowchart illustrating an operation for receiving the input in the "touch panel input mode" described above. The flowchart in FIG. 3 illustrates that the input apparatus 1 receives an input when the touch sensor 11 detects the contact and the contact locates at a position corresponding to the key or the like, and then provides a tactile sensation and performs a predetermined operation. In order to start the operation illustrated in the flowchart in FIG. 3, the objects such as the key and the like are displayed on the display unit 14 of the input apparatus 1 before receiving the operation to the touch face of the touch sensor 11 by the operator. According to the present embodiment, the objects may be graphic images suggesting, to the operator, a position where the operator should touch such that the input apparatus performs the predetermined operation. For example, the objects displayed on the display unit 14 may be graphic images of the keys having numbers or characters depicted on key tops.

When the input apparatus 1 according to the present embodiment starts the operation in the "touch panel input mode", the control unit 15 monitors the contact to the touch sensor 11. The operation illustrated in FIG. 3 starts at a point when the contact to the touch face of the touch panel 11 by the operator is detected.

At step S11, when the touch sensor 11 detects the contact by a pressing object (pressing means) such as the operator's finger, a stylus pen or the like in a predetermined area on the touch sensor 11 corresponding to an area having the object displayed on the display unit 14, the control unit 15 performs operations at step S12 and thereafter. According to the present embodiment, the "predetermined area" is an area of the touch sensor 11 corresponding to a position where the object such as the keys and the buttons are displayed on the display unit 14. Since the "predetermined area" corresponds to the key and the like, it is referred to simply as a "key area" appropriately in the following description.

When the position of the contact locates inside the key area at step S11, the control unit 15 changes a display state of the object corresponding to the position of the detected contact on the display unit 14 (step S12). Such change of the display state of the object at step S12 may be, for example, indicating a key depression when a mechanical push-button switch is pressed down by the operator (hereinafter, referred to as a "key depression display"). Or, color or brightness of the object may be momentarily changed in order to emphasize detection of the contact by the operator.

After the key depression display at step S12, the control unit 15 drives the tactile sensation providing unit 13 with a predetermined drive signal such that the touch sensor 11 is vibrated in a predetermined vibration pattern and provides the tactile sensation (step S13). The tactile sensation providing unit 13 drives, for example, two piezoelectric vibrators 32 in phase. Feeling the vibration, the operator may recognize that the input of the contact by the operator is received normally. Then, the control unit 15 performs the predetermined operation following a predetermined procedure (step S14).

The "predetermined operation" at step S14 is a prescribed operation assigned to the object corresponding to position where the contact is detected. For example, when the object of a character key corresponds to the position where the contact is detected, the control unit 15 performs an operation to output (display) the character. Or, when the object of a function execution key corresponds to the position where the contact is detected, the control unit 15 performs an operation to start execution of the function. The "predetermined operation" also includes an operation to switch to the "haptic input mode" described above when the input apparatus 1 is in the "touch panel input mode".

The operation of the touch panel input mode described above allows the input apparatus having a normal touch sensor to perform an operation similar to a conventional operation: detecting a contact of an operation by the operator, notifying the operator of detection of the contact through the display or vibration, and performing the operation corresponding to the detection of the contact.

Figure 4:
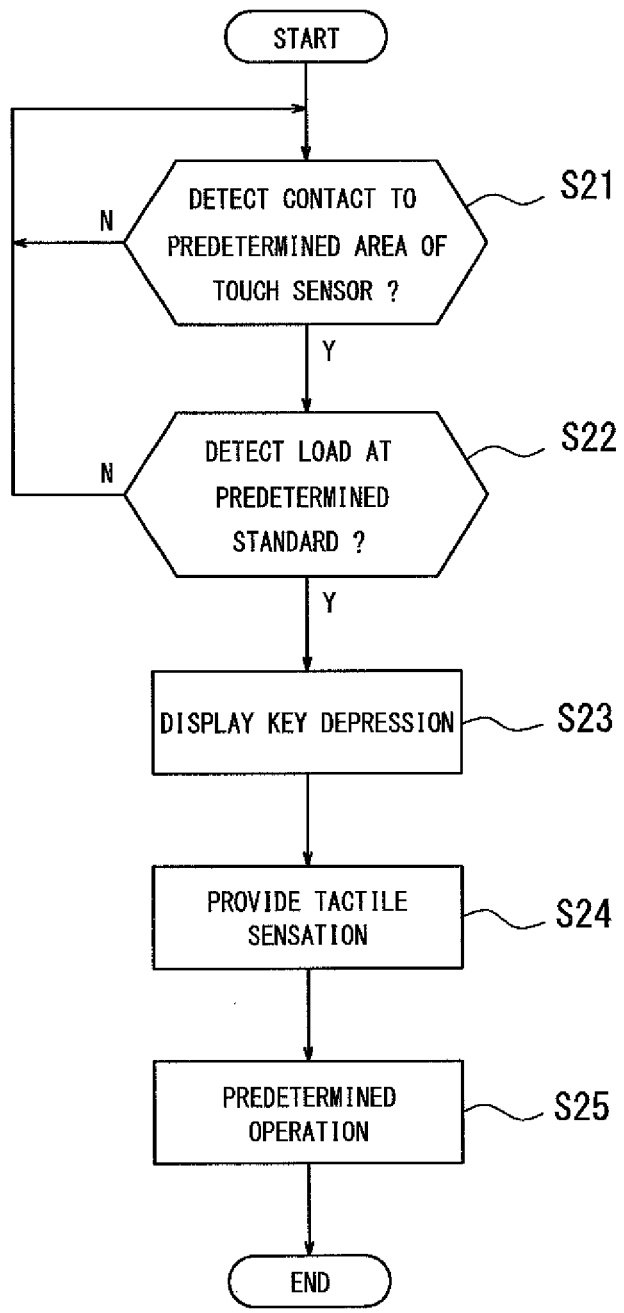
FIG. 4 is a flowchart illustrating an operation of a haptic input mode according to the first embodiment.

FIG. 4 is a flowchart illustrating an operation for receiving an input in the "haptic input mode" described above. The flowchart illustrated in FIG. 4 illustrates that the input apparatus 1 receives an input not when the touch sensor 11 detects the contact but when a position of the contact corresponds to the key or the like and the pressure load satisfying the predetermined standard load is detected, then provides the tactile sensation and performs the predetermined operation. In order to start the operation illustrated in the flowchart in FIG. 4 also, the objects such as the key and the like are preliminarily displayed on the display unit 14 of the input apparatus 1 before receiving the operation to the touch face of the touch sensor 11 by the operator.

When the input apparatus 1 according to the present embodiment starts the operation in the "haptic input mode", the control unit 15 monitors the contact to the touch sensor 11 and the pressure load detected by the load detection unit 12. The operation illustrated in FIG. 4 also starts at the point when the contact to the touch face of the touch panel 11 by the operator is detected.

At step S21, when the touch sensor 11 detects the contact by the pressing object (pressing means) such as the operator's finger, the stylus pen or the like in the key area, the control unit 15 performs operations at step S22 and thereafter.

At step S22, the control unit 15 determines whether the pressure load detected by the load detection unit 12 is increased by a pressure on the touch sensor 11 by the operator and satisfies the predetermined standard load. The load detection unit 12 detects the load from, for example, an average output value of the four strain gauge sensors 31. Here, it is preferable that the pressure load satisfying the predetermined standard load is preset to be, for example, 1 N (Newton) based on the pressure load of a usual pressing operation by the operator and resettable thereafter. Also, in order to avoid receiving an inadvertent contact operation when the operator lightly touches the touch sensor 11 and also to provide the operator with a pressure sensation for a realistic tactile sensation described below, it is avoided to set the predetermined standard too low in consideration of the pressure load of the operation intended by the operator (for example, an average value of the pressure loads). When the contact to the key area of the touch sensor 11 is detected at step S21 and the pressure load detected by the load detection unit 12 does not satisfy the predetermined standard load at step S22, the control unit 15 returns to step S21 and continues the operation.

When detecting the pressure load satisfying the predetermined standard load at step S22, the control unit 15 changes the display state of the object corresponding to the position of the detected contact on the display unit 14 (step S23). At step S23, the display state of the object may be changed in a similar manner to that at step S12 described above.

After the key depression display at step S23, the control unit 15 drives the tactile sensation providing unit 13 with the predetermined drive signal such that the touch sensor 11 is vibrated in the predetermined vibration pattern and provides the tactile sensation (step S24). The tactile sensation providing unit 13 drives, for example, two piezoelectric vibrators 32 in phase. As described above, the input apparatus 1, in the "haptic input mode", receives the input of the operation intended by the operator.

Preferably, the tactile sensation provided to the pressing object by the tactile sensation providing unit 13 at step S24 is the click sensation described above. In order to provide a realistic click sensation to the operator, the input apparatus 1 stimulates a tactile sensation of the operator while stimulating a pressure sensation, by the following operation. That is, the input apparatus 1 stimulates the pressure sensation until the pressure load applied to the touch sensor 11 satisfies the standard load for providing the tactile sensation (for example, 1 N) and, when the pressure load satisfies the standard load, stimulates the tactile sensation by driving the piezoelectric vibrator 32 with the predetermined drive signal such that the touch face 11a is vibrated. Thereby, the input apparatus 1 may provide the operator with the click sensation similar to that obtained when pressing the button switch such as the push-button switch (push-type button switch). Accordingly, even with an object of the push-button switch graphically depicted on the touch sensor, since the operator may carry out an operation to the touch sensor 11 feeling the realistic click sensation similar to that obtained when operating the actual push-button switch, the operator does not have a feeling of strangeness. Moreover, since the operator may carry out the operation in conjunction with a perception to "have pressed" the touch sensor 11, erroneous operations caused by mere touching may be prevented.

The drive signal for providing the click sensation described above, that is, a certain frequency, a cycle (wavelength), a waveform and vibration amplitude for stimulating the tactile sensation may be set appropriately according to the click sensation to be provided. For example, in order to provide the click sensation represented by a metal dome switch employed by the mobile terminal, the tactile sensation providing unit 13 is driven by the drive signal of, for example, a sine wave with a frequency of 170 Hz, for 1 cycle. The tactile sensation providing unit 13 is driven with this drive signal such that the touch face 11a is vibrated by approximately 15 μm under a pressure load Pth satisfying the standard load. Thereby, the realistic click sensation similar to that obtained when pressing down an actual key may be provided to the operator.

After providing the tactile sensation at step S24, the control unit 15 performs the predetermined operation following the predetermined procedure (step S25). The "predetermined operation" at step S25 is the same as that at step S14 described above. When the input mode of the input apparatus 1 is the "haptic input mode", the "predetermined operation" includes the operation to switch the input mode of the input apparatus 1 to the "touch panel input mode".

The operation of the haptic input mode described above, unlike that of the input apparatus having the normal touch sensor, provides the realistic tactile sensation similar to that of the push-button switch when receiving the input based on the pressing operation by the operator.

Next, an operation to set the input mode based on detection of the problem according to the present embodiment will be described. According to the present embodiment, a mode to detect the problem with the load detection unit 12 at activation of the input apparatus 1 such as when the input apparatus 1 is powered up and a mode to detect the problem with the load detection unit 12 at switchover from the touch panel input mode to the haptic input mode will be described.

Figure 5:
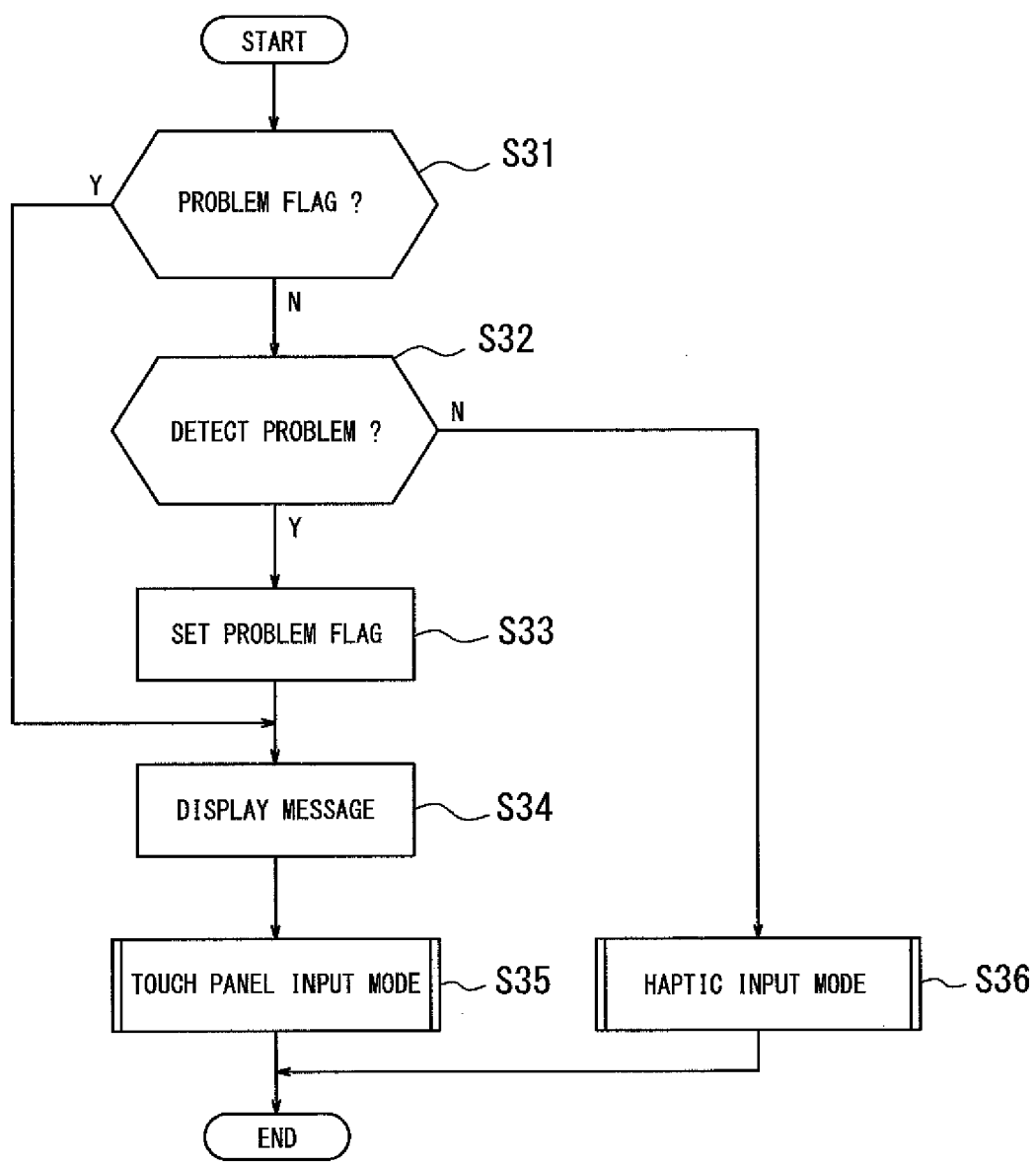
FIG. 5 is a flowchart illustrating an operation for starting the haptic input mode at activation of the input apparatus according to the first embodiment.

FIG. 5 is a flowchart illustrating an operation for starting the haptic input mode at activation of the input apparatus 1 such as when the input apparatus 1 is powered up. This operation starts at activation of the input apparatus 1 when, for example, the input apparatus 1 is powered up. When a power switch of the input apparatus 1 is turned on and the input apparatus 1 starts the operation, the control unit 15 determines whether the problem flag is set (step S31).

At step S31, it is assumed that a case when the "problem flag" is set at step S31 is a case that, during a previous operation prior to turning on the power and starting the input apparatus 1 this time, the problem with the load detection unit 12 is detected and the problem flag has been set. At step S31, when the problem flag is not set, the control unit 15 determines whether the problem detection unit 16 is detecting the problem with the load detection unit 12 (step S32). When the problem detection unit 16 is not detecting the problem with the load detection unit 12 at step S32, the control unit 15 controls to switch the input mode to the "haptic input mode" described above (step S36). Then, the control unit 15 performs the operation of the haptic input mode described with reference to FIG. 4.

On the other hand, when the problem detection unit 16 detects the problem with the load detection unit 12 at step S32, the control unit 15 sets the problem flag (step S33). Since the problem flag is set at step S33, the control unit 15, without actual detection whether the load detection unit 12 has the problem by the problem detection unit 16, may recognize that the problem has been occurred. Preferably, the problem flag is stored in the control unit 15 or the like such that the problem flag being set is not cleared when the power of the input apparatus 1 is turned off. Accordingly, when the power is turned off after the problem flag is set and then the power is turned on to start the input apparatus 1, the control unit 15 may recognize that the load detection unit 12 has the problem at step S31 without actual detection of the problem by the problem detection unit 16.

When the problem flag is set at step S33, the control unit 15 displays, on the display unit 14, a message that the problem with the load detection unit 12 is detected (step S34) and controls to switch the input mode to the "touch panel input mode" described above (step S35). Then, the control unit 15 performs the operation of the touch panel input mode described with reference to FIG. 3.

Here, the "message that the problem with the load detection unit 12 is detected" displayed on the display unit 14 preferably notifies the operator of that "a pressure sensor is broken" and that "the touch panel input mode has been set". At this time, displaying a message that "the input is received upon contact; no need to press touch panel" together with the above message offers an effect to reduce erroneous operations by the operator thereafter.

When the control unit 15 determines that the problem flag is set at step S31, the control unit 15 displays the message that the problem with the load detection unit 12 is detected on the display unit 14 (step S34) and controls to switch the input mode to the "touch panel input mode" described above (step S35). Then, the control unit 15 performs the operation of the touch panel input mode described with reference to FIG. 3.

According to the present embodiment, as described above, the operation starts in the haptic input mode when the problem with the load detection unit 12 is not detected and the operation starts in the touch panel input mode when the problem with the load detection unit 12 is detected. Accordingly, a disadvantage that the operator is unable to operate since the operation has started in the haptic input mode despite the problem with the load detection unit 12 and the load detection unit 12 is unable to detect the pressure load thereafter, is prevented.

The example described with reference to FIG. 5 assumes the operation at activation of the input apparatus 1 by powering up or the like. However, at the start of the operation of the control unit 15, the operation described with reference to FIG. 5 may be performed as the operation to start the operation in the haptic input mode.

Figure 6:
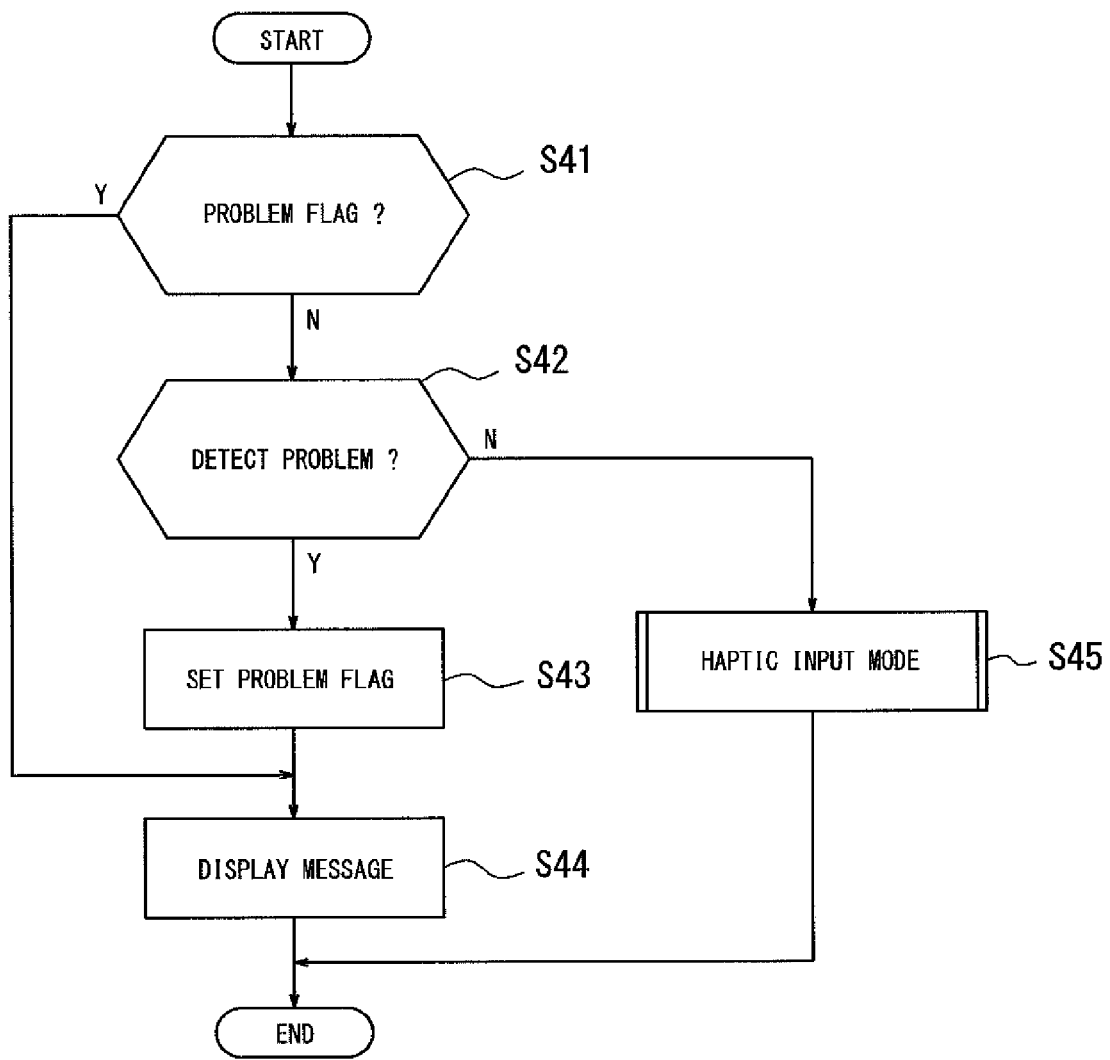
FIG. 6 is a flowchart illustrating an operation of the input apparatus according to the first embodiment for switching to the haptic input mode after starting the touch panel input mode.

FIG. 6 is a flowchart illustrating an operation to switch to the haptic input mode after starting the operation in the touch panel input mode. This operation starts at a point when the operator switches to the haptic input mode while the input apparatus 1 is operating in the touch panel input mode after starting the operation in the touch panel input mode. This switchover may be performed upon receiving an input operation by the operator to select the "haptic input mode" in, for example, a menu select panel.

When the operation starts upon operation to switch to the haptic input mode by the operator, that is, when the input to switch to the haptic input mode is received, the control unit 15 determines whether the problem flag described above is set (step S41).

At step S41, when the problem flag is not set, the control unit 15 determines whether the problem detection unit 16 is detecting the problem with the load detection unit 12 (step S42). When the problem detection unit 16 is not detecting the problem with the load detection unit 12 at step S42, the control unit 15 controls to switch the input mode to the "haptic input mode" described above (step S45). Then, the control unit 15 performs the operation of the haptic input mode described with reference to FIG. 4.

On the other hand, when the problem detection unit 16 detects the problem with the load detection unit 12 at step S42, the control unit 15 sets the problem flag (step S43). Since the problem flag is set at step S43 as described above, the control unit 15 may recognize, without actual detection of the problem with the load detection unit 12 by the problem detection unit 16, that the problem has been occurred.

When the problem flag is set at step S43, the control unit 15 displays the message that the problem with the load detection unit 12 is detected on the display unit 14 (step S44) and ends the operation. In this case, since the input apparatus 1 has started the operation in the touch panel input mode, the control unit 15, after ending the operation, continues the operation in the touch panel input mode.

Here, the "message that the problem with the load detection unit 12 is detected" displayed on the display unit 14 preferably notifies the operator of that "the pressure sensor is broken" and that "the haptic input mode cannot be set".

Also, when the control unit 15 determines at step S41 that the problem flag is set, the control unit 15 displays the message that the problem with the load detection unit 12 is detected on the display unit 14 (step S44) and ends the operation.

According to the present embodiment, as described above, after the operation of the touch panel input mode is started, the input mode is switched to the haptic input mode when the problem with the load detection unit 12 is not detected and the operation of the touch panel input mode is maintained when the problem with the load detection unit 12 is detected. Accordingly, the disadvantage that the operator is unable to operate since the operator has switched to the haptic input mode despite the problem with the load detection unit 12 and the load detection unit 12 is unable to detect the pressure load thereafter, is prevented.

Second Embodiment

Next, an input apparatus according to a second embodiment of the present invention will be described. An input apparatus 2 according to the second embodiment may have a configuration similar to that of the input apparatus 1 described in the first embodiment, although the operation by the control unit 15 described in the first embodiment is partially altered. Hence, the same descriptions as those of the first embodiment will be omitted appropriately.

The second embodiment is applicable when the input apparatus 1 according to the first embodiment receives input of a plurality of levels relative to the pressure load such as, for example, a shutter button of a camera. That is, the input apparatus 2 according to the second embodiment may receive inputs of a plurality of levels by changing the operations performed in the "haptic input mode" and the "touch panel input mode" described in the first embodiment with reference to FIG. 5 and FIG. 6.

First, an operation in the "haptic input mode" performed when the problem detection unit 16 does not detect the problem with the load detection unit 12, that is, when the load detection unit 12 may normally detect the pressure load on the touch sensor 11 will be described.

Figure 7:
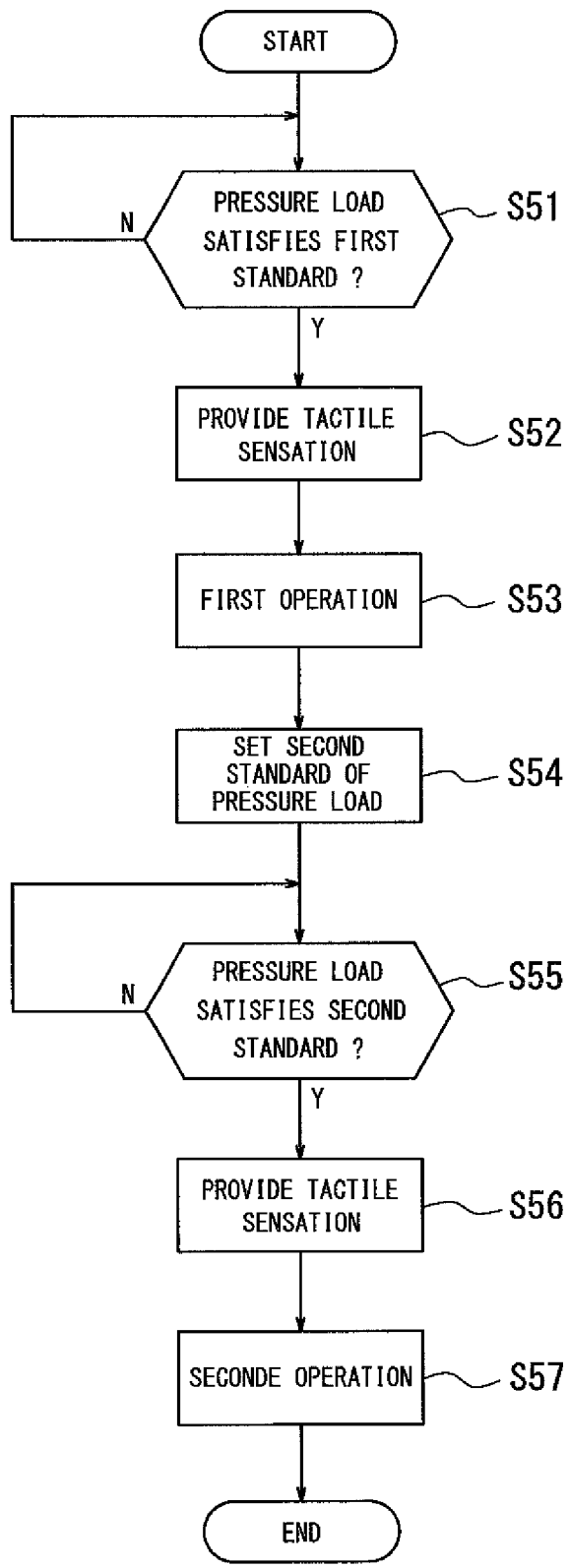
FIG. 7 is a flowchart illustrating an operation of the haptic input mode according to a second embodiment.

FIG. 7 is a flowchart illustrating an input reception operation of the input apparatus 2 according to the present embodiment when the load detection unit 12 may normally detect the pressure load. According to the present embodiment, it is assumed that, in operation of the input apparatus 2, the operator already knows that the input apparatus 2 receives inputs of at least two levels relative to the pressure load. The following is a description of a case when a contact operation by the operator is detected in the predetermined key area on the touch sensor 11. Accordingly, a description about a determination on whether the contact operation by the operator is detected in the predetermined key area on the touch sensor 11 is omitted.

The control unit 15 of the input apparatus 2 monitors whether the touch sensor 11 detects the contact operation by the operator on the touch face of the touch sensor 11. The input reception operation by the input apparatus 2 illustrated in FIG. 7 starts at a point when the touch sensor 11 detects the contact to the touch face of the touch sensor 11. When the input apparatus 2 according to the second embodiment starts the input reception operation, the control unit 15 determines whether the load detection unit 12 has detected the pressure load increasing by the pressing operation of the operator and satisfying a first standard load for receiving a first level input (step S51).

The first standard load for receiving the first level input is a predetermined threshold of the pressure load serving as a standard. When the load detection unit 12 detects a pressure load exceeding the threshold, the control unit 15 determines that the first level input defined by the input apparatus 2 is received and performs an operation accordingly. Although the first standard load for receiving the first level input is the predetermined threshold of the pressure load, it may be changed afterward according to preference of the operator.

When the pressure load satisfying the first standard load for receiving the first level input is not detected at step S51, the input apparatus 10 enters a waiting state. On the other hand, when the pressure load satisfying the first standard load for receiving the first level input is detected at step S51, the control unit 15 drives the tactile sensation providing unit 13 with the predetermined drive signal such that the touch sensor 11 is vibrated in the predetermined vibration pattern and provides the tactile sensation (step S52). According to the present embodiment, in order to indicate reception of the first level input, the tactile sensation provided at step S53 is preferably different from a tactile sensation indicating reception of a second level input described below. Accordingly, the operator, at a point when this tactile sensation is provided, may recognize that the first level input is normally received by the input apparatus 2.

Along with the above operation, the control unit 15, upon reception of the first level input, also controls to perform an operation corresponding to the first level input defined by the input apparatus 2 (step S53). For example, when the input apparatus 2 is applied to the shutter button of the camera, the operation at step S53 corresponds to an operation for "halfway pressing" of the input apparatus 2, that is, an operation to turn on a function for adjusting AF.

When the operator, through the generated vibration, recognizes that the first level input is normally received, the operator maintains the pressure of the input (that is, the operator suppresses increase of the pressure), in an attempt to prevent performing the second level input at once. Here, any operator, through the generated vibration, may recognize that the first level input is normally received. However, the pressure for maintaining the pressure of the operation applied by the operator after the operator recognizes the reception of the first level input varies significantly between operators.

According to the present embodiment, therefore, based on the pressure load at the point when the operator maintains the pressure of the operation after recognizing the reception of the first level input, a second standard load for receiving the second level input is set (step S54). That is, every time the load detection unit 12 detects the pressed load satisfying the first standard load for receiving the first level input, the control unit 15 sets the second standard load for receiving the second level input based on the pressed load detected by the load detection unit 12 after the first standard load is satisfied. At this time, the second standard load for receiving the second level input is greater than the first standard load for receiving the first level input.

In order to perform the operation described above, the control unit 15 determines the pressed load at the point when the operator maintains the pressure of the operation. For example, the control unit 15, by calculating a temporal change ratio of the pressure load detected by the load detection unit 12, determines the pressure load at a point when the change ratio of the pressure load first reduces to be equal to or lower than a predetermined value after step S51 (that is, when the control unit 15 may determine that the operator is maintaining the pressure) as the pressure load.

After the pressure load at which the operator maintains the pressure of the operation is determined as described above, the control unit 15 sets the second standard load for receiving the second level input by adding a predetermined addition width to the pressure load (step S54). Setting the second standard load in this manner enables, regardless of addition of the same addition width, to set different second standard loads based on the pressure load at the point when the operator maintains the pressure of the operation.

Subsequently, the control unit 15 determines whether the load detection unit 12 has detected the pressure load increasing by the pressing operation by the operator and satisfying the second standard load for receiving the second level input (step S55). The second standard load for receiving the second level input is a predetermined threshold of the pressure load set in the process described above. When the load detection unit 12 detects a pressure load exceeding the threshold after the second standard load is set in the above manner, the control unit 15 determines that the second level input defined by the input apparatus 2 is received and operates accordingly.

When the pressure load satisfying the second standard load for receiving the second level input is not detected at step S55, the input apparatus 10 enters the waiting state. On the other hand, when the pressure load satisfying the second standard load for receiving the second level input is detected at step S55, the control unit 15 drives the tactile sensation providing unit 13 with the predetermined drive signal such that the touch sensor 11 is vibrated in the predetermined vibration pattern and provides the tactile sensation (step S56). According to the present embodiment, in order to indicate reception of the second level input, the tactile sensation provided at step S56 is preferably different from the tactile sensation indicating reception of the first level input. Accordingly, the operator, at a point when this tactile sensation is provided, may recognize that the second level input is normally received by the input apparatus 2.

Along with the above operation, the control unit 15, upon reception of the second level input, performs an operation corresponding to the second level input defined by the input apparatus 2 (step S57). For example, when the input apparatus 2 is applied to the shutter button of the camera, the process at step S57 corresponds to an operation of "full pressing" of the input apparatus 2, that is, an operation to release the shutter after the function to adjust AF appropriately.

According to the present embodiment, as described above, the second standard load for receiving the second level input is set based on the pressed load after the first standard load is satisfied. Accordingly, even for an operator who operates the input apparatus 2 for the first time, a risk to perform the "full pressing" at once, not knowing how to adjust the pressure appropriately, is reduced. Also, even when a plurality of different operators use the input apparatus 2, the input apparatus 2 appropriately sets the second standard load of the pressure load by adopting the pressure of the operation by each of the operators. Therefore, it is not necessary for each of the operators to adjust the pressure load in accordance with the pressure load required by the input apparatus 2.

According to the present embodiment, the operation in FIG. 7 described above is set as the operation of the "haptic input mode (step S36 in FIG. 5 or step S45 in FIG. 6) when the problem detection unit 16 is not detecting the problem with the load detection unit 12. That is, the input apparatus 2 according to the present embodiment, when the problem detection unit 16 is not detecting the problem with the load detection unit 12 in FIG. 5 or FIG. 6, receives the inputs of plurality of levels in the haptic input mode described with reference to FIG. 7 at step S36 or S45 and performs the corresponding operation.

The following is a description of the operation in the "touch panel input mode" performed by the input apparatus 2 according to the present embodiment when the problem detection unit 16 is detecting the problem with the load detection unit 12 in FIG. 5 or FIG. 6, that is, when the load detection unit 12 may not normally detect the pressure load on the touch sensor 11.

FIG. 8 is a flowchart illustrating an input reception operation of the input apparatus 2 according to the present embodiment when the pressure load may not be normally detected. The following, also, describes a case when the operator performs the contact operation to the predetermined key area of the touch sensor 11. Accordingly, the description about the determination on whether the contact operation by the operator is detected in the predetermined key area on the touch sensor 11 is omitted.

The control unit 15 of the input apparatus 2 according to the present embodiment monitors whether the touch sensor 11 detects the contact operation to the touch face of the touch sensor 11 by the operator. The input reception operation according to the present embodiment starts at a point when the input apparatus 2 starts the operation in the "touch panel input mode". When the input reception operation according to the second embodiment starts, the control unit 15 determines whether the contact operation to the touch face of the touch sensor 11 by the operator is detected (step S61).

When the contact is not detected at step S61, the input apparatus 10 enters the waiting state. On the other hand, when the contact is detected at step S61, the control unit 15 drives the tactile sensation providing unit 13 with the predetermined drive signal such that the touch sensor 11 is vibrated in the predetermined vibration pattern and provides the tactile sensation (step S62). According to the present embodiment, the process at step S62 corresponds to that at step S52 described with reference to FIG. 7. Accordingly, upon generation of the vibration, the operator may recognize that the first level input is normally received by the input apparatus 2.

Along with this operation, the control unit 15, upon reception of the first level input, also performs the operation such that the operation corresponding to the first level input defined by the input apparatus 2 is performed (step S63). The operation at step S63 corresponds to that at step S53 described with reference to FIG. 7.

After performing the operation corresponding to the first level input at step S63, the control unit 15 determines whether the touch sensor 11 stops detecting the contact as the operator has released the contact to the touch face of the touch sensor 11 (step S64). When the contact is not released at step S64, the input apparatus 2 enters the waiting state.

On the other hand, when the contact is released at step S64, the control unit 15 sets a predetermined time T (step S65). The predetermined time T is a time to count down until a next contact is detected after release of a previous contact to the touch sensor 11. When the next contact to the touch sensor 11 is detected before the predetermined time T is counted down to 0, the control unit 15 considers this contact as the second level input or an input of a level thereafter in pressing operations of a plurality of levels.

That is, when the next contact is detected after release of the previous contact to the touch sensor 11 within the predetermined time T, the control unit 15 considers the next input as the second level input performed when the pressure load satisfying the second standard load is detected in the haptic input mode and performs the corresponding operation. When a further next contact is detected within the predetermined time T after release of the next contact, the control unit 15 considers the further next contact as a third level input performed when a pressure load satisfying a third standard load is detected in the haptic input mode and performs a corresponding operation. By performing operations similar to the above operations, the input apparatus 2, even when a problem with the touch sensor 11 is detected and the pressure load may not be detected, may substitute the contacts for the pressing operations of a plurality of levels.

When the predetermined time T is set at step S65, the control unit 15 determines whether the contact to the touch face of the touch sensor 11 by the operator is detected (step S66). When the contact is detected at step S66, the control unit 15 drives the tactile sensation providing unit 13 with the predetermined drive signal such that the touch sensor 11 is vibrated in the predetermined vibration pattern and provides the tactile sensation (step S67). According to the present embodiment, the process at step S67 corresponds to that at step S56 described with reference to FIG. 7. Accordingly, at a point when this tactile sensation is provided, the operator may recognize that the second level input is normally received by the input apparatus 2.

Along with the above operation, the control unit 15, upon reception of the second level input, performs the operation corresponding to the second level input defined by the input apparatus 2 (step S68) and the ends the operation. The process at step S68 corresponds to that at step S57 described with reference to FIG. 7.

On the other hand, when the contact is not detected at step S66, the control unit 15 counts down the predetermined time T (step S69). The control unit 15 determines whether the predetermined time T is counted down to 0 (step S70). When the predetermined time T is not yet counted down to 0, the control unit 15 returns to step S66 to continue the operation. When the predetermined time T is counted down to 0, the control unit 15 ends the operation.

According to the present embodiment, as described above, even when the problem detection unit 16 is detecting the problem with the load detection unit 12, that is, when the load detection unit 12 may not normally detect the pressure load on the touch sensor 11, the inputs of a plurality of levels may be received in the "touch panel input mode". Accordingly, the disadvantage that the operator is unable to perform the inputs of a plurality of levels since the operator has switched to the haptic input mode despite the problem with the load detection unit 12 and the load detection unit 12 is unable to detect the pressure load thereafter, is prevented.

Next, specific examples of the operation by the input apparatus 2 according to the present embodiment to substitute detected contacts for the pressing operations of a plurality of levels will be described.

Note that, in order to substitute the contacts for the pressing operations of a plurality of levels, the message displayed on the display unit 14 at step S34 in FIG. 5 and step S44 in FIG. 6 is preferably partially different from the massage displayed in the first embodiment. That is, according to the present embodiment, the "message that the problem with the load detection unit 12 is detected" displayed on the display unit 14 preferably notifies the operator of that "the pressure sensor is broken" and that, due to the problem, "the touch panel input mode is set", although the same notification as that in the first embodiment may be displayed. According to the present embodiment, however, displaying a further notification such as "Contact once for first level input. Quickly contact two times for the second level input." offers an effect to reduce erroneous operations by the operator thereafter.

FIG. 9 is a diagram illustrating specific examples of the operation by the input apparatus 2 according to the present embodiment to substitute the detected contacts for the pressing operations of a plurality of levels. In FIG. 9, a horizontal line represents elapse of the time from the left to the right. In FIG. 9, also, a down-pointing arrow indicates that a contact is detected at the point (touch) and an up-pointing arrow indicates that a detected contact is released at the point (release).

FIG. 9(*a*) illustrates a state that, since the touch sensor 11 detects the contact operation by the operator and then release of the contact, the input apparatus 2 provides the tactile sensation and performs the operation corresponding to the first level input. FIG. 9(*b*) illustrates a state that, since the touch sensor 11 detects a next contact after detection of release of a previous contact before the predetermined time T is counted down to 0, the input apparatus 2 provides the tactile sensation and performs the operation corresponding to the second level input.

FIG. 9(*c*) illustrates a state that, in each contact operation, although it slightly takes time for the touch sensor 11 to detect release of the contact after detecting the contact, the next contact is detected after detection of release of the previous contact before the predetermined time T is counted down to 0, thus leading to the same result as that in FIG. 9(*b*). FIG. 9(*d*) illustrate a state that, after the state illustrated in FIG. 9(*c*), since the touch sensor 11 detects a further next contact after detecting release of the next contact before the predetermine time T is counted down to 0, the input apparatus 2 provides the tactile sensation and performs the operation corresponding to the third level input.

FIG. 9(*e*) illustrates a state that, since the touch sensor 11 detects the next contact after detection of release of the previous contact when the predetermined time T is counted down to 0, the input apparatus 2 provides the tactile sensation and performs the operation corresponding to the first level input instead of the operation corresponding to the second level input.

According to the present embodiment, as described above, when the problem detection unit 16 is detecting the problem with the load detection unit 12, the operator, by adjusting a timing of the contact operation, may perform the inputs of a plurality of levels as desired.

It is to be understood that the present invention is not limited to the above embodiments but may be modified or varied in a multiple of manners. According to each of the above embodiments, for example, although the click sensation is provided when the load detection unit 12 detects the pressure load satisfying the predetermined standard load, no mention is made about a release sensation. However, the release sensation may be provided when, in a similar manner to the click sensation, the pressure load detected by the load detection unit 12 stops satisfying the predetermined standard load. Also, when the click sensation and the release sensation are different from each other, a tactile sensation similar to that of an actual press-button switch may be provided. However, the click sensation and the release sensation may provide the same tactile sensation. Further, none of the above embodiments mentions about whether to generate a sound in each operation. However, appropriately generated sound in conjunction with the operations in each of the above embodiments may further improve operability of the input apparatus 1 and reduce erroneous operations.

According to each of the above embodiments, the input apparatus 1 provides the tactile sensation and performs the predetermined operation when the contact is detected (in the touch panel input mode) or when the pressure load satisfying the predetermined standard load is detected (in the haptic input mode). However, providing the tactile sensation and/or performing the predetermined operation may be when release of a contact is detected or when the pressure load stops satisfying the predetermined standard load, instead of when the contact is detected or when the pressure load satisfying the predetermined standard load is detected.

According to each of the above embodiments, the problem detection unit 16 detects the problem with the load detection unit 12 when the input apparatus 1 is activated such as upon being powered up or when the input apparatus 1 switches to the operation in the haptic input mode after starting the operation in the touch panel input mode. However, under circumstances with sufficient power supply, for example, the problem detection unit 16 may continuously or periodically detect whether the load detection unit 12 has the problem. Thereby, the input apparatus 1, upon detection of the problem with the load detection unit 12 in the haptic input mode, may forcibly switch to the touch panel input mode.

The load detection unit 12 in each of the above embodiments may be configured by using any number of strain gauge sensors. Also, the load detection unit 12 may be configured according to a contact detection scheme of the touch sensor. For example, the load detection unit 12 may be configured without using the strain gauge sensor when the load detection unit 12 may detect the pressure load from a change of an output signal based on a resistance change in accordance with a contact area in using the resistive film type. Or, the load detection unit 12 may be configured without using the strain gauge sensor when the load detection unit 12 may detect the pressure load from a change of an output signal based on a change in capacitance in using the capacitive type.

Moreover, the tactile sensation providing unit 13 may be configured by using any number of piezoelectric vibrators or by using transparent piezoelectric elements provided on an entire surface of the touch sensor. Also, when the tactile sensation providing unit 13 may vibrate and provide the tactile sensation, the tactile sensation providing unit 13 may be configured by using an eccentric motor which rotates 360 degrees in 1 cycle of the drive signal. Further, when the load detection unit 12 and the tactile sensation providing unit 13 are configured by using piezoelectric elements, both units may share the piezoelectric elements.

According to the input apparatuses 1 and 2 of the present invention, the tactile sensation providing unit 13 is driven when the pressure load detected by the load detection unit 12 satisfies the standard load. This "when the pressure load detected by the load detection unit satisfies the standard" may represent "when the pressure load detected by the load detection unit reaches a standard value", "when the pressure load detected by the load detection unit exceeds the standard value", or "when the standard value is detected by the load detection unit 12".

The control unit 15 of the input apparatuses 1 and 2 of the present invention, when the problem detection unit 16 detects the problem with the load detection unit 12, controls to prevent the operation to switch to the second input mode (the haptic input mode). However, the control unit 15 of the input apparatuses 1 and 2, when the problem detection unit 16 detects the problem with the load detection unit 12 during the operation in the first input mode (the touch panel input mode), may control to perform the operation to switch to the second input mode.

Further, the problem detection unit 16 according to the present invention detects whether the load detection unit 12 is unable to detect the pressure load on the touch sensor 11 due to the problem with the load detection unit 12. The problem detection unit 16 may adopt any known method in order to detect whether the load detection unit 12 is unable to detect the pressure load. For example, the problem detection unit 16 may pass a constant electric current to the load detection unit 12 and measure a voltage impressed on the load detection unit 12 at that time. When a measured voltage is greatly different from a usual voltage, the problem detection unit 16 may determine that the pressure load on the touch sensor cannot be detected.

REFERENCE SIGNS LIST 11 touch sensor
11a touch face
12 load detection unit
13 tactile sensation providing unit
14 display unit
15 control unit
16 problem detection unit
21 housing
22 insulator
23 upper cover
24 insulator
31 strain gauge sensor
32 piezoelectric vibrator

The invention claimed is:

1. An input apparatus comprising:
a touch sensor;
a load detection unit configured to detect a pressure load on the touch sensor;
a problem detection unit configured to detect a problem with an ability of the load detection unit to detect a pressure load; and
a control unit configured to control switchover between a first input mode for executing a predetermined operation when the touch sensor detects a contact and a second input mode for performing the predetermined operation when the load detection unit detects a pressure load satisfying a predetermined standard load while the touch sensor is detecting the contact, wherein
the control unit, when the problem detection unit detects the problem with the load detection unit, controls to prevent an operation to switch to the second input mode.

2. The input apparatus according to claim 1, wherein the control unit, when the problem detection unit detects the problem with the load detection unit upon receiving an input to switch to the second input mode, controls to prevent the operation to switch to the second input mode.

3. The input apparatus according to claim 1, wherein the control unit, when the problem detection unit detects the problem with the load detection unit at the start of an operation, controls to prevent the operation to switch to the second input mode.

4. The input apparatus according to claim 3, wherein the control unit, when the problem detection unit detects the problem with the load detection unit at activation of the input apparatus, controls to start the operation in the first input mode.

5. The input apparatus according to any one of claim 1, further comprising a tactile sensation providing unit configured to vibrate a touch face of the touch sensor, wherein the control unit, when the load detection unit detects the pressure load satisfying the predetermined standard load while the touch sensor is detecting the contact, controls the tactile sensation providing unit to provide a tactile sensation to a pressing object pressing the touch face.

* * * * *